United States Patent [19]
Bahner et al.

[11] 3,984,075
[45] Oct. 5, 1976

[54] STAND FOR HAND CALCULATOR

[76] Inventors: Randal E. Bahner, 220 D. W. Carriage Drive, Santa Ana, Calif. 92707; Jay B. Haws, 431 Madrona Ave., Brea, Calif. 92621

[22] Filed: Aug. 25, 1975

[21] Appl. No.: 607,100

[52] U.S. Cl. ................................. 248/13; 70/58
[51] Int. Cl.² ............... E05B 69/00; E05B 73/00; F16M 13/00
[58] Field of Search ............... 248/19, 23, 25, 203, 248/181, 13; 70/58, 232

[56] References Cited
UNITED STATES PATENTS

| | | | |
|---|---|---|---|
| 696,167 | 3/1902 | Forester | 248/181 |
| 1,962,548 | 6/1934 | Zerk | 248/181 |
| 2,497,797 | 2/1950 | Rogers | 248/203 X |
| 3,519,236 | 7/1970 | Schmidt et al. | 248/181 |
| 3,664,616 | 5/1972 | Raskin | 248/203 X |
| 3,707,860 | 1/1973 | Singer | 248/25 |
| 3,743,224 | 7/1973 | Singer | 248/203 |
| 3,850,392 | 11/1974 | Gassaway | 248/203 X |

*Primary Examiner*—J. Franklin Foss
*Attorney, Agent, or Firm*—Knobbe, Martens, Olson Hubbard & Bear

[57] ABSTRACT

A desk-top stand for a small hand-held calculator includes a base section, adapted to sitting on a desk top, connected through an adjustable friction swivel joint to a platform member on which the calculator rests. A lock is provided for locking the calculator to the desk top through the swivel connector, the lock including a cable attached to the calculator and removable from the calculator only if the calculator is lifted from its support platform by a predetermined distance. A padlock prevents lifting the calculator this predetermined distance when the calculator is in a locked configuration.

16 Claims, 5 Drawing Figures

STAND FOR HAND CALCULATOR

BACKGROUND OF THE INVENTION

The present invention is directed toward a stand for a portable or hand-held calculator and, more particularly, to a swivel stand permitting convenient operation of such a calculator and convenient reading of its display.

Small hand-held electronic calculators have been sold in recent years in ever increasing numbers. These calculators are generally suited to being held in one hand of a user while the other hand is used to manipulate the switches on the calculator for performing desired calculations.

Calculators of this type are not readily adaptable to desk calculator use since, in order to maintain the compact size desirable for a hand-held calculator, these machines normally have an extremely flat profile. Thus, they cannot be placed any appreciable distance from the user on a desk top and still adequately and comfortably be manipulated and read. Because of the low cost of these units, however, they are rapidly replacing many desk-top calculators which are designed for easier manipulation and reading. It is also readily recognized that the small size of these calculators makes them particularly susceptible to theft, especially in circumstances where they are used as desk-top calculators and left in place.

Even if a calculator were propped up on a desk top to provide adequate manipulation and viewing, it would not provide comfortable use for an operator, since the position of the calculator and the position of the user's hand will dictate various positions of the calculator to maximize user comfort.

SUMMARY OF THE INVENTION

The present invention alleviates these and other difficulties of the prior art by providing a support platform for a hand-held calculator which allows pivoting to a variety of positions under frictional restraint so that, in any of the various positions, the calculator will be relatively stable. In addition, the present invention provides an adjustable frictional restraint so that the rigidity of the calculator support platform may be adjusted.

In addition, the calculator stand of the present invention permits locking the calculator on the desk top on which the portable stand is positioned so that the calculator may be left unattended without fear of theft. The locking feature of the present invention additionally permits removal of the calculator from the locking assembly so that it may be used in a hand-held configuration when it is not positioned on the calculator support platform of the present invention.

These and other features of the present invention are best understood through a reference to the drawings, in which.

DETAILED DESCRIPTION OF THE PREFERRED EMBODIMENT

Figure 1:
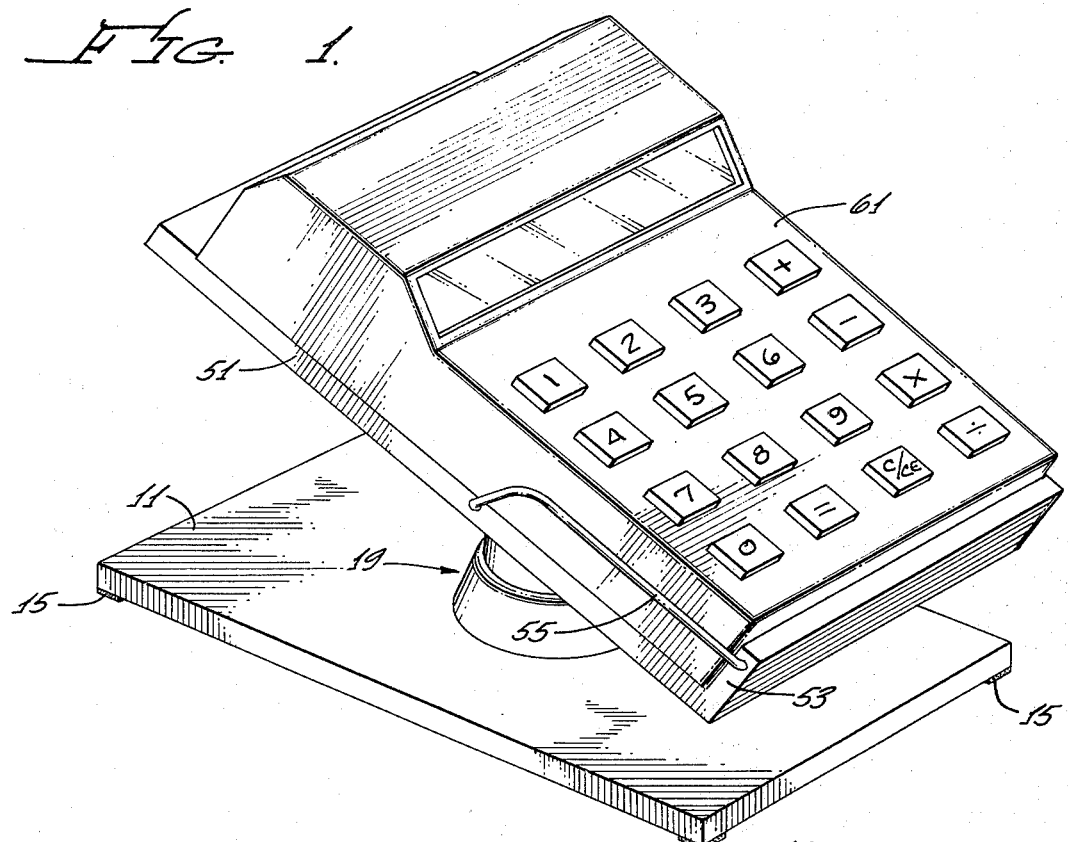
FIG. 1 is a perspective view of the calculator stand of the present invention.
Figure 2:
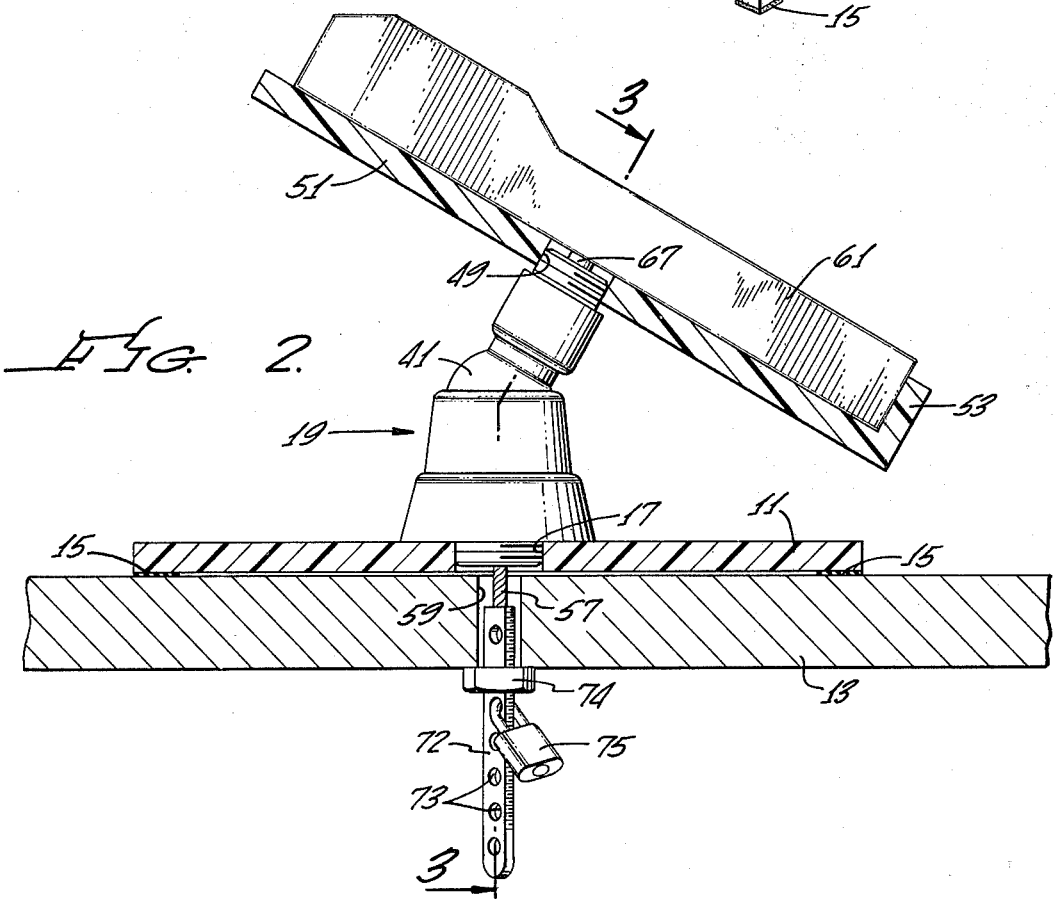
FIG. 2 is an elevation view, partially in section, showing various elements of the calculator stand of FIG. 1 and the locking apparatus, and additionally showing the desk top supporting the stand.
Figure 3:
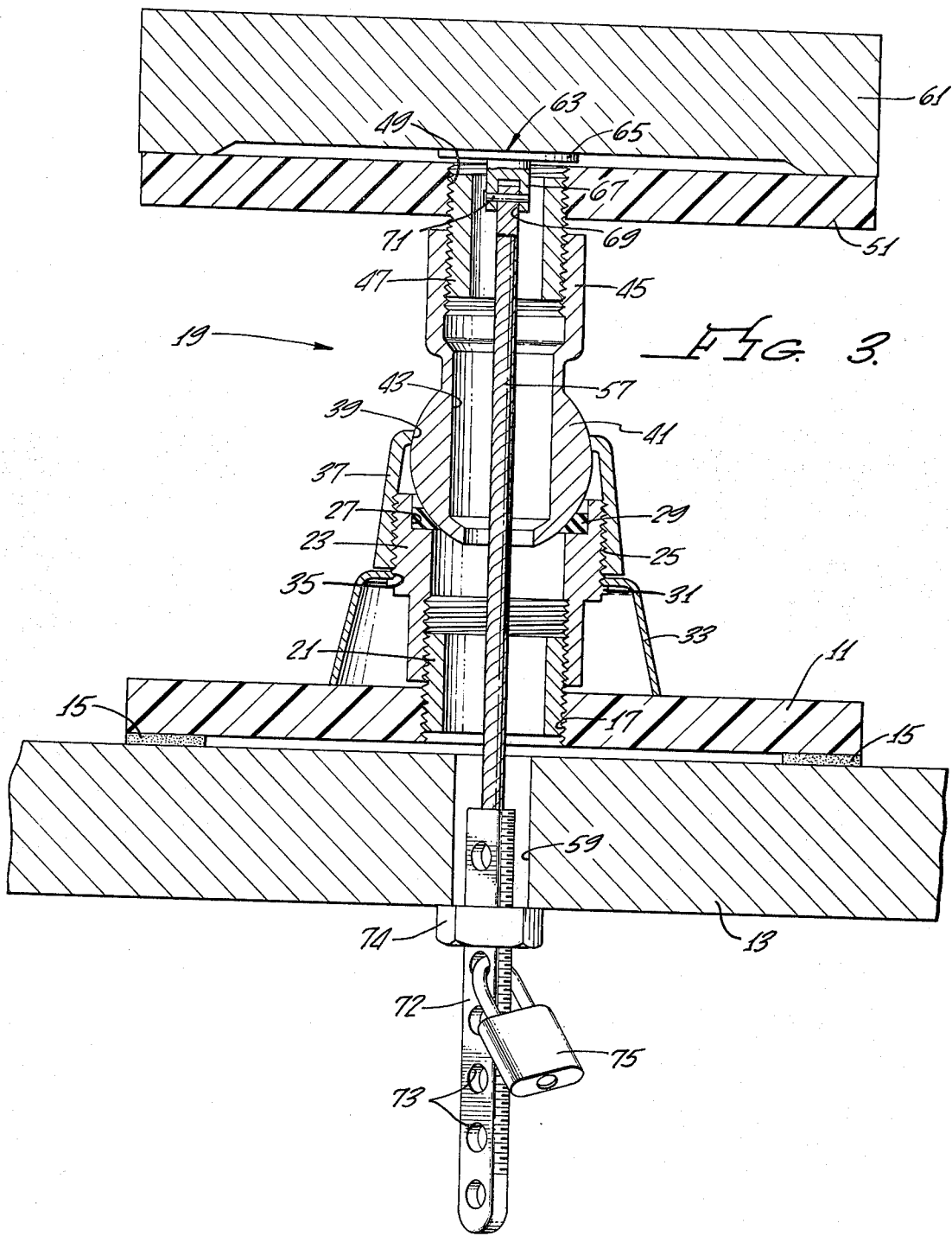
FIG. 3 is a sectional view, taken along lines 3—3 of FIG. 2, showing the details of the swivel ball and socket joint of the stand.

Referring initially to FIGS. 1, 2 and 3, the calculator stand of the present invention will be described. The stand includes a base platform 11 which may be manufactured of any rigid material and is conveniently relatively flat to conform to the flat top of a desk 13. The platform 11 may include a plurality of resilient feet 15, typically formed from sheet foamed polymer material, which may be attached, for example, at each corner if the platform 11 is rectangular, as shown. The platform 11, in a specific example has been manufactured of clear Lucite to provide an attractive stand. The flat base platform 11 is apertured at 17 to provide a passage for the locking mechanism which will be described below and to provide mounting for a swivel ball joint connector 19 of the calculator stand. The aperture 17 is preferably internally threaded to receive a threaded nipple 21 in the form of a tubular element which is externally threaded. The nipple 21 may conveniently be manufactured of polymer material such as polyvinylchloride and, through threaded engagement with both the base platform 11 and an internally threaded sleeve 23, provides rigid support for the swivel connector 19 on the base 11.

The threaded sleeve 23, in addition to internal threads which mate with the nipple 21, includes external threads 25 for adjusting the friction of the swivel joint 19 and an internal shoulder 27 for supporting an annular frictional element 29. The annular frictional element 29 may be, for example, a neoprene O-ring situated against the shoulder 27.

The threaded sleeve 23 additionally includes a flange 31 of increased diameter surrounding the outside of the threaded member 23 at the extremity of the thread 25 to provide a seat for a decorative cowling 33. This cowling 33 may be threaded at 35 to provide attachment to the threads 25 of the threaded member 23.

A cup member 37 together with the sleeve 23 provides the socket for the ball joint swivel connector 19. The cup member 37 includes an enlarged aperture 39 and is threaded onto the threads 25 to adjustably position the aperture 39 along the axis of the threaded member 23. The aperture 39 of the cup member 37 is smaller than the diameter of a spherical member 41 which forms the movable ball element of the ball joint swivel connector 19. The diameter of the friction element 29 is likewise smaller than the diameter of the spherical element 41 so that, when the threaded sleeve 37 is threaded onto the threaded member 23, the spherical member 41 is locked between the circular aperture 39 of the cup member 37 and the annular frictional element 29. The cup member 37 may be tightened onto the threaded member 23 to increase the friction between the frictional element 29 and the spherical element 41 to resist relative motion between these parts.

It will be recognized that the spherical element 41 is free to pivot about the center of the sphere 41 in any direction, limited only by the frictional contact between the spherical element 41 and the frictional element 29. The spherical element 41 includes a cylindrical central cavity 43 to provide a through aperture for the locking mechanism, as will be described below.

The spherical element 41 additionally includes a cylindrical extension 45, preferably formed unitarily with the spherical element 41, and internally threaded for receipt of a threaded nipple 47. This threaded nipple 47 is additionally threaded into the internal thread of an aperture 49 of an upper support plate 51 of the calculator stand. The threaded nipple 47 thus rigidly interconnects the spherical member 41 with the upper support plate 51 so that the upper support plate 51 is connected to the base platform 11 through the intermediate ball and socket swivel joint 19. This connection permits positioning of the upper support plate 51 at an infinite variety of positions comfortable to various calculator operators, and a relatively rigid maintenance of a selected position through the frictional contact between the spherical element 41 and frictional element 29.

The upper support plate 51 is preferably a flat rectangular sheet of rigid material which, in a specific example, may be Lucite. This upper support plate 51 may include an extending ledge 53 attached along one edge of the plate 51 and a pair of wire side supports 55 along opposite sides, connected to the upper support plate 51 and ledge 53. The ledge 53 and supports 55 partially enclose a hand-held calculator 61 and assure that it will not move relative the upper support plate 51.

If the locking mechanism, which will be described below, is not utilized, it can be seen that the base platform 11 may be placed on the top of a desk 13 and will rest immovably on the desk 13 due to the friction of the resilient feet 15. An operator may then swivel the upper support plate 51 to a desired position by overcoming the frictional contact of the frictional element 29 with the spherical element 41, and may utilize the calculator in this position. A tightening of the cup element 37 on the threaded member 23 will make the calculator more rigid in this selected position, while a loosening of this threaded interconnection will permit easy swivel adjustment.

A locking mechanism may be included in the calculator support stand of the present invention. As shown in FIGS. 2 and 3 the internal bore of the nipples 21 and 47, as well as the central cavities of the threaded member 23 and spherical member 41, provide a central aperture through the entire swivel mechanism 19. A flexible cable 57 may be passed through this central aperture and through a mating aperture 59 in the desk top 13 on which the calculator stand is placed. The cable 57 is attached to the hand-held calculator 61 by means of a connector 63 which is formed as a unitary element and includes an enlarged, typically circular, flange portion 65 and an extending cylindrical portion 67. The flat surface of the flange 65 opposite the cylindrical portion 67 is attached to the underside of the calculator 61 through adhesive or other rigid interconnecting means which prohibit removal of the calculator 61 from the connector 63. The cylindrical portion 67 includes an aperture 69 for receipt of one end of the flexible cable 57. A pin 71 passes through a lateral aperture in the cylindrical portion 67 and a lateral aperture in the end of the flexible cable 57 to fasten these elements together. The aperture within the cylindrical portion 67 which receives the pin 71 is spaced from the flange 65 by a substantial distance so that, if the cable 57 is sufficiently tight to prohibit lifting the calculator 61 and connector 63 away from the upper support plate 51, the pin 71 will not be accessible and can therefore not be removed since it is positioned within the nipple 47.

The other end of the cable 57 is rigidly attached to an elongate bar 72, preferably formed of metal. The bar 72 includes plural apertures 73 for accommodating desk tops 13 of different thickness. A padlock 75 is passed through one of these apertures 73 to lock the calculator 61 to the desk top 13. The plural apertures 73 are sufficiently close to one another so that an aperture may be selected for the padlock 75 which will prohibit the calculator from being lifted from the upper support plate 51 by a sufficient distance to permit access to the pin 71. Opposite edges of the elongate bar 72 may be threaded to receive a nut 74. This nut 74 is used to tighten the cable 57 by bearing against the underside of the desk top 13. The lock 75 prohibits loosening of the nut 74 sufficiently to permit access to the pin 71.

The calculator may be removed from the support stand and cable 57 by removing the padlock 75, loosening the nut 74, and lifting the calculator 61 from the upper support plate 51, permitting access to the pin 71 which may then be pressed out of the connector 63 and cable 57 to permit hand-held use of the calculator with the connector 63 remaining attached but the cable 57 removed.

Figure 4:
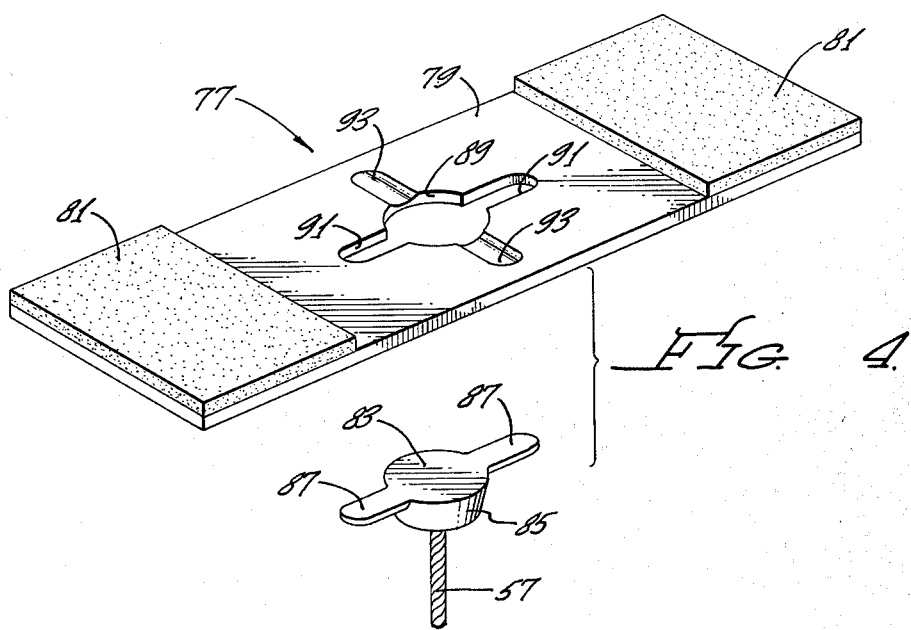
FIG. 4 is a perspective view of an alternate locking assembly for the calculator stand of the present invention.

Referring now to FIG. 4, an alternate connector for attaching the cable 57 to the underside of the calculator 61 will be described. In this alternate embodiment, a connector 77 is attached to the underside of the calculator 61 and includes a rigid flat plate 79 attached to a pair of spacer legs 81. The legs 81 are attached with adhesive or other rigid attaching means to the underside of the calculator 61. The legs 81 provide a slight offset for the plate 77 from the bottom of the calculator 61. The cable 57 is attached to a twist lock element 83 which includes a circular portion 85 and a pair of dogs 87 radiating from the circular portion 85. The locking plate 79 includes a circular aperture 89 in communication with a pair of radial slots 91 which pass completely through the plate 79. A pair of radially emanating depressions 93 communicate with the central aperture 89 on the surface of the plate 79 adjacent the calculator 61 but do not pass completely through the plate 79.

It can be seen that the dogs 87 may be passed through the slots 91 so that the dogs 87 may be positioned between the plate 79 and calculator 61. The twist lock 83 can then be rotated so that the dogs 87 rest within the depressions 93. As with the embodiment shown in FIG. 1, a padlock 75 may then be attached to the other end of the cable 57. The padlock 75 is passed through an aperture 73 in an elongate bar 72 attached to the cable 57, the aperture 73 being close enough to the bottom of the desk top 13 or nut 74 to prohibit the dogs 87 from being lifted completely out of the depressions 93 so that a rotation of the twist lock 83 is prohibited unless the padlock 75 is removed. Once the padlock is removed, the twist lock 83 may be lifted completely out of the depressions 93 and the space between the plate 79 and back of the calculator 71 provided by the legs 81 permits rotation of the dogs 87 between the plate 79 and calculator 61 to position the dogs 87 above the slots 91. Thus, the calculator 61 with its attached locking plate 77 may be removed from the cable 57 and stand for hand-held use.

Figure 5:
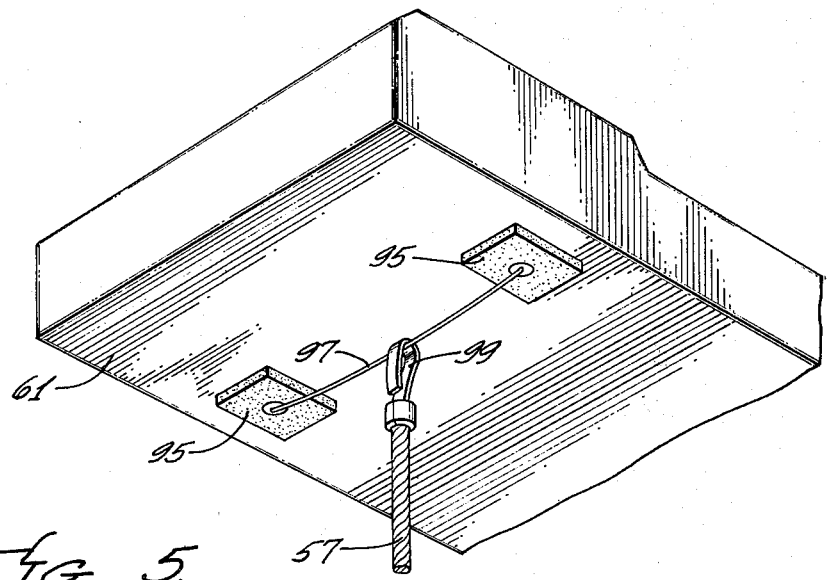
FIG. 5 is a perspective view of a second alternate locking mechanism for use with the calculator stand of the present invention.

Referring now to FIG. 5, an additional locking mechanism will be described. In this embodiment a pair of plates 95 are attached, as by adhesive or other rigid interconnecting means, to the back of a hand-held calculator 61. These plates 95 are each rigidly connected to a cable 97 which interconnects the plates 95. The cable 97 is relatively taut between the plates 95 and is adapted to interconnect with a rigid hook 99 attached to the end of the cable 57. The hook 99 resides within the threaded nipple 47 shown in FIG. 3 when the calculator 61 is locked to the desk top 13, and it is impossible to remove the hook 99 from the wire 97 without lifting the calculator 61 a substantial distance to remove the hook 99 from the nipple 47. Such lifting is prohibited by the padlock 75, so that, as with the previous embodiments, the calculator is attached to the cable 57 by an interconnecting mechanism which prohibits disconnection so long as the padlock 75 is in place, since one of the interconnecting elements must be lifted out of the nipple 47 to unlock the mechanism. Once the padlock 75 has been removed, the cable 57 may be raised through the swivel connector 19 and the hook 99 may be removed from the cable 97 to provide hand-held use of the calculator 61.

The present invention thus provides a swivel connection platform for a hand-held calculator with an adjustable frictional contact for varying the force required to swivel the support plate 51. In addition, the present invention provides a locking mechanism which permits locking the calculator 61 to a desk top 13 through the swivel connector 19 while also providing hand-held use of the calculator 61 after removal of the attaching cable 57.

What is claimed is:

1. A portable calculator and stand combination for use on any desk top, comprising:
   a calculator of the hand-held type;
   a ball and socket swivel joint having a pair of elements attached to swivel relative one another;
   platform means for supporting one element of said swivel joint on any flat desk top,
   friction means attached to the side of said platform means opposite said swivel joint to prevent skidding of said platform means on said desk top when said platform means is resting unattached on said desk top, and,
   means for supporting said hand-held calculator on the other element of said swivel joint to permit said calculator to swivel relative said desk top.

2. A portable calculator and stand combination as defined in claim 1 wherein said platform means comprises a flat plate positionable on said desk top, said flat plate rigidly attached to said one element.

3. A portable calculator and stand combination as defined in claim 1 wherein said means for supporting said hand-held portable calculator comprises a flat support plate rigidly attached to said other element.

4. A portable calculator and stand combination as defined in claim 1 additionally comprising:
   means for locking said swivel joint in a selected position.

5. A portable calculator and stand combination as defined in claim 1 additionally comprising:
   a frictional element mounted on said swivel joint for resisting swivel movement of said joint.

6. A portable calculator and stand combination as defined in claim 5 additionally comprising:
   means for adjusting said frictional element to alter the resistance of said joint to swivel movement.

7. A stand for supporting a hand-held calculator on a desk top, comprising:
   a ball and socket swivel joint having a pair of elements attached to swivel relative one another;
   means for supporting one element of said swivel joint on said desk top, and
   means for supporting said hand-held calculator on the other element of said swivel joint to permit said calculator to swivel relative said desk top;
   said swivel joint, said means for supporting one element of said swivel joint and said means for supporting said calculator including apertures, said apertures aligned to provide a conduit through said stand.

8. A stand for a hand-held calculator as defined in claim 7 additionally comprising:
   locking means attached to said calculator and passing through said conduit.

9. A stand for a hand-held calculator as defined in claim 8 wherein said locking means comprises:
   a first element attached to said calculator;
   an elongate second element passing through said conduit, said second element removably attachable to said first element; and
   a lock selectively attachable to said elongate second element.

10. A stand for a hand-held calculator as defined in claim 9 wherein said elongate second element comprises:
    means removably attachable to said first element, said means removable only when said calculator is spaced from said means for supporting said calculator.

11. A locking attachment for attaching hand-held calculators to a platform, said platform including an aperture, comprising:
    a first interlocking element attached to said calculator;
    a second interlocking element passing through said aperture and interlockingly engaged with said first element;
    means preventing disengagement of said first and second interlocking elements from one another except when said calculator is spaced from said platform by more than a predetermined distance; and
    locking means attached to said second interlocking element for prohibiting said second interlocking element from passing through said aperture and for thereby prohibiting said calculator from being spaced from said platform by said predetermined distance.

12. A locking attachment as defined in claim 11 wherein said first interlocking element comprises a flat plate secured to said calculator, said plate spaced from said calculator and including an aperture formed as a circle with a pair of slots connected to said circular aperture along a first diameter of said circular aperture, said plate including a pair of recesses on the side of said plate adjacent said calculator, said recesses passing part way through said plate and connected to said circular aperture along a second diameter of said circular aperture, and wherein said second interlocking element comprises an elongate flexible member and a pair of dogs mounted at one end of said elongate flexible member and protruding at a right angle to the axis of said elongate flexible member, said dogs sized to pass through said pair of slots connected to said circular aperture, to fit within said space between said calculator and said plate and to rest within said pair of recesses.

13. A locking attachment as defined in claim 11 wherein said first interlocking element comprises a first elongate member mounted on the surface of said calculator and spaced therefrom, the axis of said first elongate member being parallel to said surface of said calculator, and wherein said second interlocking element comprises a second elongate member having a hook at one end, said hook sized to fit around said first elongate member and having a length which exceeds said predetermined distance.

14. A locking attachment as defined in claim 11 wherein said first interlocking element comprises a hollow tubular element having an aperture normal to the axis of said tubular element and spaced from said calculator by a distance greater than said predetermined distance, said tubular element designed to fit within the aperture in said desk top, and wherein said second interlocking element comprises:
   an elongate member passing through said aperture in said desk top; and
   means for connecting one end of said elongate member to said aperture of said tubular element.

15. A stand for supporting a hand-held calculator on a desk top comprising:
   a platform for supporting said hand-held calculator;
   means for supporting said platform on said desk top including means for tilting said platform to any selected one of a plurality of positions on said desk top; and
   means connected to said desk at one end, passing through said platform and said supporting means and connected to said calculator at the other end for locking said hand-held calculator to said desk top.

16. A stand for supporting a hand-held calculator as defined in claim 15 wherein said means for locking additionally passes through said desk top.

* * * * *